United States Patent
Adiga et al.

(10) Patent No.: US 9,934,041 B2
(45) Date of Patent: Apr. 3, 2018

(54) PATTERN BASED BRANCH PREDICTION

(71) Applicant: International Business Machines Corporation, Armonk, NY (US)

(72) Inventors: Narasimha R. Adiga, Bangalore (IN); Jatin Bhartia, Uttar Pradesh (IN); Akash V. Giri, Austin, TX (US); Matthias Heizmann, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 314 days.

(21) Appl. No.: 14/789,065

(22) Filed: Jul. 1, 2015

(65) Prior Publication Data
US 2017/0003970 A1    Jan. 5, 2017

(51) Int. Cl.
G06F 9/38    (2006.01)
G06F 9/30    (2006.01)

(52) U.S. Cl.
CPC ........ *G06F 9/3844* (2013.01); *G06F 9/30058* (2013.01); *G06F 9/3806* (2013.01)

(58) Field of Classification Search
None
See application file for complete search history.

(56) References Cited

U.S. PATENT DOCUMENTS

| 5,394,529 A | 2/1995 | Brown, III et al. |
| 5,553,255 A * | 9/1996 | Jain ........................ G06F 9/3804 |
| | | 711/204 |

(Continued)

FOREIGN PATENT DOCUMENTS

| EP | 0463973 A2 | 1/1992 |
| EP | 0463977 B1 | 1/1992 |
| WO | 03029961 A1 | 4/2003 |

OTHER PUBLICATIONS

Milenkovic, Milena, et al.; "Demystifying Intel Branch Predictors"; Workshop on Duplication, Deconstructing and Debunking; p. 1-10; 2002.

(Continued)

*Primary Examiner* — Eric Coleman
(74) *Attorney, Agent, or Firm* — Cantor Colburn LLP; William A. Kinnaman, Jr.

(57) ABSTRACT

A method comprises identifying a number of branches ($N_b$) and a number of iterations ($N_i$) in a loop in an instruction stream, generating a number of forward branches until the number of forward branches equals $N_b$, generating a non-branch instruction in between the forward branch instruction, recording in a memory, instruction stream generated and a history of each branch, an associated target address of each branch, and whether the branch is a taken branch or a not taken branch, determining whether a loop iterator number (i) is less than $N_i$-1, generating a backward branch with a target address which is greater than or equal to the start address and is lesser than the current address responsive to determining that (i) is less than $N_i$, and recording in the memory, a branch instruction of the generated backward branch and the associated target address of the backward branch.

20 Claims, 5 Drawing Sheets

(56) References Cited

U.S. PATENT DOCUMENTS

| | | | |
|---|---|---|---|
| 5,729,554 | A | 3/1998 | Weir et al. |
| 5,935,241 | A | 8/1999 | Shiell et al. |
| 6,076,158 | A | 6/2000 | Sites et al. |
| 6,108,775 | A | 8/2000 | Shiell et al. |
| 6,167,509 | A | 12/2000 | Sites et al. |
| 6,256,727 | B1 * | 7/2001 | McDonald ............ G06F 9/3804 712/205 |
| 6,256,728 | B1 * | 7/2001 | Witt .................... G06F 9/30021 711/E12.043 |
| 6,327,559 | B1 | 12/2001 | Wile |
| 6,385,720 | B1 * | 5/2002 | Tanaka .................... G06F 9/325 712/213 |
| 7,243,350 | B2 | 7/2007 | Lindwer |
| 7,877,742 | B2 * | 1/2011 | Duale ................... G06F 11/263 717/124 |
| 8,566,569 | B2 | 10/2013 | Bonanno et al. |
| 8,869,123 | B2 * | 10/2014 | Mykland .................. G06F 8/45 717/148 |
| 9,547,495 | B1 | 1/2017 | Adiga et al. |
| 2004/0003210 | A1 | 1/2004 | Duale et al. |
| 2006/0095750 | A1 | 5/2006 | Nye et al. |
| 2012/0216023 | A1 | 8/2012 | Bansal et al. |
| 2014/0201507 | A1 | 7/2014 | Jayaseelan et al. |

OTHER PUBLICATIONS

Adiga, Narasimha R. et al. Pending Application entitled: "Pattern Based Branch Prediction", U.S. Appl. No. 15/373,510, filed Dec. 9, 2016.

List of IBM Patents or Patent Applictions Treated as Related; (Appendix P), Filed Mar. 22, 2017, 2 pages.

* cited by examiner

PATTERN BASED BRANCH PREDICTION

BACKGROUND

The present invention relates to processors, and more specifically, to branch prediction.

Many processors use algorithms to predict branches in the instruction stream. Branch prediction predicts if branches will deviate from the sequential stream, and if so also predicts where the new non-sequential instruction stream begins. The predictions improve the processor performance by allowing for speculative execution, which avoids stalling execution for branch resolution and target address determination.

Bimodal predictors use branch history tables (BHT) to predict branches. However, bimodal predictors loose accuracy when they attempt to predict branches that exhibit changing behavior such as, branches with different resolution or target addresses.

Pattern history tables (PHT) have been used to detect patterns in the instruction stream and use those detected patterns to more efficiently predict branches that exhibit changing behavior. PHTs ideally track all unique paths of instructions that lead to the branch to achieve accurate branch prediction.

SUMMARY

A method comprises identifying a number of branches ($N_b$) and a number of iterations ($N_i$) in a loop in an instruction stream of a processor, generating a number of forward branches until the number of forward branches equals $N_b$, generating a non-branch instruction in between the forward branch instruction, recording in a memory, instruction stream generated and a history of each branch, an associated target address of each branch, and whether the branch is a taken branch or a not taken branch, determining whether a loop iterator number (i) is less than $N_i-1$, generating a backward branch with an associated target address which is greater than or equal to the start address and is lesser than the current address responsive to determining that (i) is less than $N_i$; generating a forward branch with an associated target address which is greater than the current address responsive to determining that loop iterator number (i) is equal to Ni-1, and recording in the memory, a branch instruction of the generated backward branch and the associated target address of the backward branch.

A system comprises a memory, a processor operative to identify a number of branches ($N_b$) and a number of iterations ($N_i$) in a loop in an instruction stream of a processor, generate a number of forward branches until the number of forward branches equals $N_b$, record in the memory, a history of each branch, an associated target address of each branch, and whether the branch is a taken branch or a not taken branch, determine whether a loop iterator number (i) is less than $N_i$ generate a backward branch with an associated target address which is greater than or equal to the start address and is lesser than the current address responsive to determining that it is less than $N_i$, and record in the memory, a branch instruction of the generated backward branch and the associated target address of the backward branch.

A computer program product comprising a computer readable storage medium having program instructions embodied therewith, the program instructions executable by a processor to cause the processor to perform a method comprises identifying a number of branches ($N_b$) and a number of iterations ($N_i$) in a loop in an instruction stream of a processor, generating a number of forward branches until the number of forward branches equals $N_b$, generating a non-branch instruction in between the forward branch instruction, recording in a memory, instruction stream generated and a history of each branch, an associated target address of each branch, and whether the branch is a taken branch or a not taken branch, determining whether a loop iterator number (i) is less than $N_i-1$, generating a backward branch with an associated target address which is greater than or equal to the start address and is lesser than the current address responsive to determining that (i) is less than $N_i$, generating a forward branch with an associated target address which is greater than the current address responsive to determining that loop iterator number (i) is equal to Ni-1, and recording in the memory, a branch instruction of the generated backward branch and the associated target address of the backward branch.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Using pattern history tables (PHT) to track the path of instructions that lead to a branch can increase the accuracy of the branch prediction over using branch history tables. The path which encounters a given branch affects how the branch will behave. Since there can be multiple paths that lead to the same branch instruction, the PHT should ideally track all the unique paths in order to obtain accurate prediction. It is desirable to provide quality stimulus to verify PHT based branch prediction logic (BPL).

An instruction stream generator may be used to verify PHT logic in a random verification environment. It is desirable for an instruction stream generator to produce sequences of instructions to meet these criteria: at least one branch instruction should exhibit different behavior depending on the instruction path leading to the branch instruction; the instruction stream should be biased so that a changing behavior branch is encountered by multiple paths; a consistent correlation should exist between a unique path to a given branch and the concomitant behavior of the given branch; deviation should be controlled via a stream-generator configuration; there should be multiple branches and patterns to efficiently explore the state space.

Figure 1:
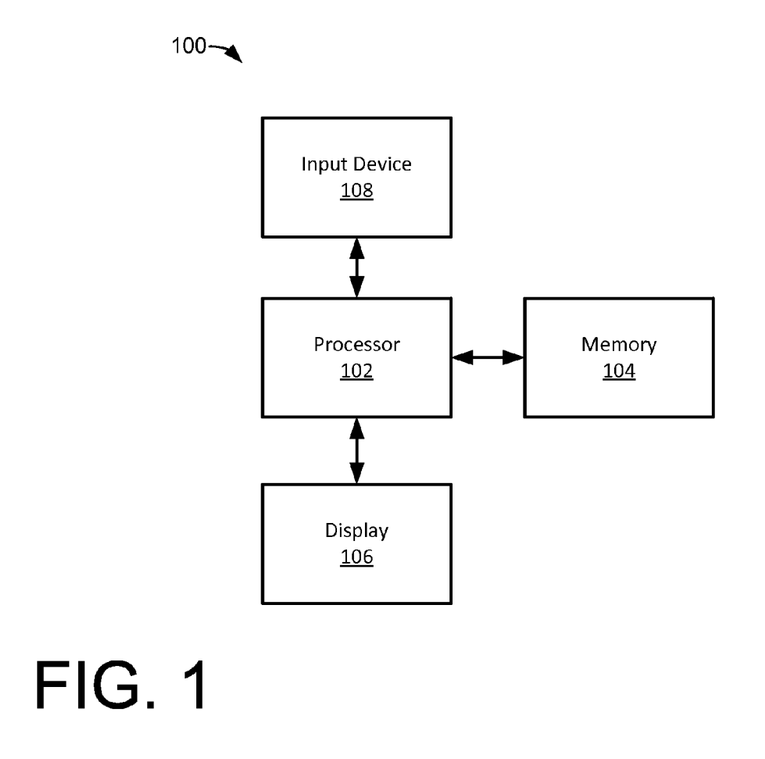
FIG. 1 illustrates an exemplary embodiment of a processing system.

FIG. 1 illustrates an exemplary embodiment of a processing system 100. The system 100 includes a processor 102 that is communicatively connected to a memory 104, a display 106, and an input device 108. The illustrated embodiment described below may be performed, for example by the processor 102 and results in an efficient stimulus generation that can be further used by processor 102 to test the microprocessor design and provide various output to the user on the display 106.

In an exemplary embodiment of the method and system described herein, a loop is generated in a random instruction stream containing a number of branch instructions that change behavior each time a branch instruction is encountered with the assumption that a given branch is encountered via different instruction paths.

In this regard an exemplary method includes the processor 102 (of FIG. 1) determining the number of branches ($N_b$) and the number of iterations ($N_i$) of the loop. The processor 102 continues to generate forward branches (conditional or non-conditional resolution, direct or indirect target address determination) until the number of branches generated reaches $N_b$. The processor maintains a history of each branch and the associated target address of each branch and the direction of the branch at resolution (i.e., taken/not taken) and stores the history in the memory 104. The processor also generates non-branch instruction padding to fill the loop. If the processor 102 determines that i<$N_i$, the processor 102 increments i and generates a backward branch (conditional/indirect) to one of the addresses for which an instruction was generated (one of the generated forward branches or non-branch pad instructions). The processor records the branch instruction and the associated target address of the branch instruction in the memory 104. The processor 102 begins to reevaluate the instruction stream if the instruction is a conditional branch instruction or an indirect branch instruction. If the instruction is a non-branch instruction, no reevaluation is performed.

If the instruction is a conditional branch instruction, the processor 102 selects the direction of the branch (taken/not taken) using a pseudo random process such that whether the direction of the branch is taken or not taken is determined substantially randomly. In some embodiments, the selection of whether a branch is taken or not taken may be biased by user selected parameters or specifications. If the branch is selected to be taken, then the processor jumps to the target address. If the branch is selected as not taken, then the processor 102 runs through the sequential instruction. The processor 102 maintains a record in the memory 104 of the directions selected for the conditional branch instruction per iteration of the loop. If the instruction is an indirect branch instruction, then the processor 102 generates a forward target address. The target address should be less than the instruction address of the backward branch described above. The processor 102 maintains a record of the target address selected for the indirect branch instruction per iteration of the loop.

The incrementing of i, generation of a backward branch, and reevaluation of the instruction stream continues until i==$N_i$. The processor proceeds with random instruction generation.

Figure 2:
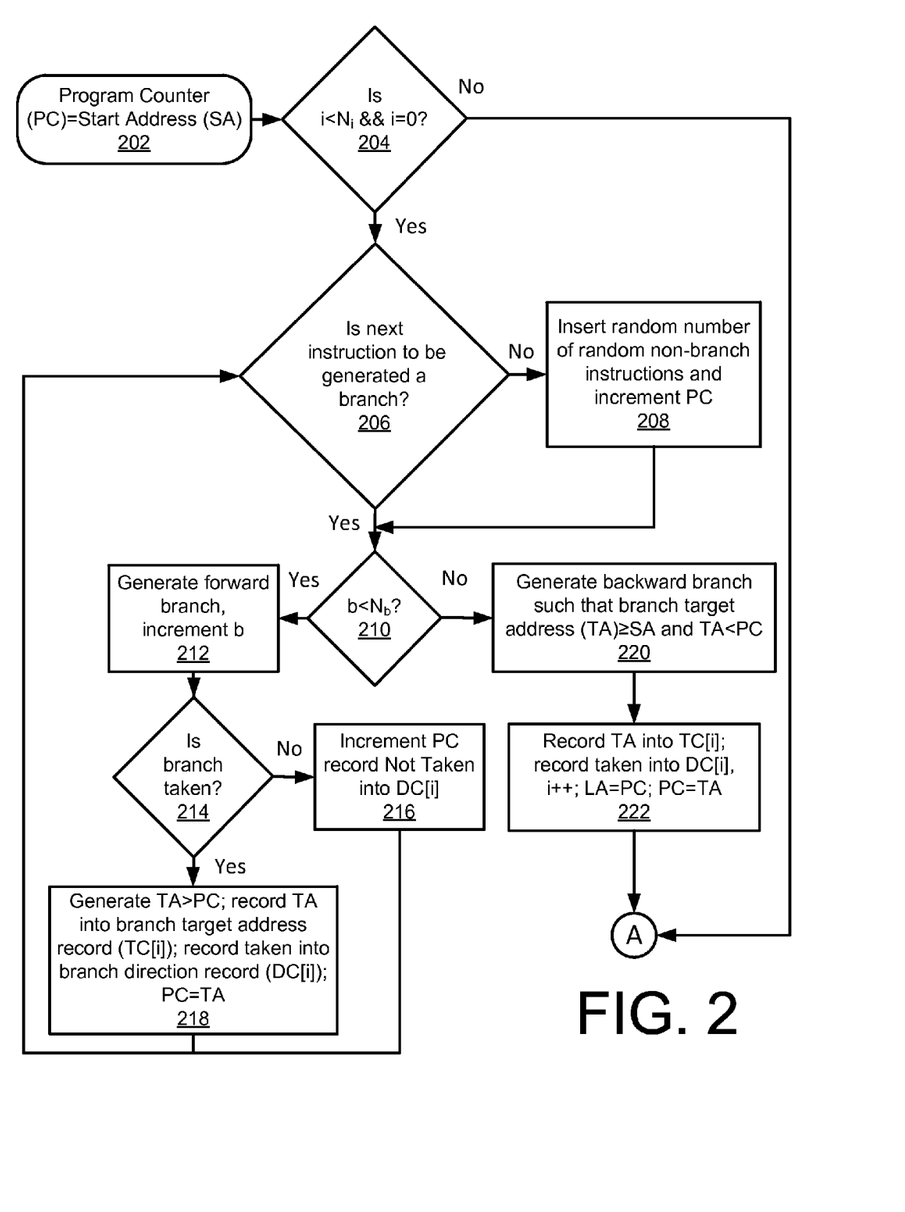
FIG. 2 illustrates a block diagram of an exemplary method of branch prediction.

FIGS. 2-5 illustrate a block diagram of an exemplary method of branch prediction that may be performed by the system 100 (of FIG. 1). Referring to FIG. 2, in block 202 the processor 102 (of FIG. 1) starts the method and the program counter (PC) equals the start address (SA). In block 204, the processor 102 determines whether i<$N_i$ and i=0, where i is the loop iterator and $N_i$ is the number of iterations needed to be run for the loop i.e. the current instruction pointer is for the initial loop iteration. If yes, in block 206, the processor 102 determines whether the next instruction to be generated is a branch. If no, a random number of random non-branch instructions are inserted into the loop and the program counter (PC) (i.e., instruction address) is incremented in block 208. If yes, in block 210, the processor 102 determines whether b<$N_b$, where b is the branch instruction count for the first iteration and $N_b$ is the number of branch instructions there will be in the loop. If yes, in block 212, a forward branch is generated and b is incremented by 1. The processor 102 determines in block 214 whether the generated branch is taken. If no, in block 216, the processor 102 increments the PC and records Not Taken into the branch direction record per branch instruction (DC[i]). The DC[i] may be stored in, for example the memory 104 (of FIG. 1). If yes, in block 218, the processor 102 generates a branch target address (TA) such that TA>PC, i.e. a forward branch is generated. The processor 102 records the TA into the branch target address record per branch instruction (TC[i]), which may be stored, for example, in the memory 104. The processor 102 records Taken into the DC[i], and changes the program counter to the target address (PC=TA). In block 210, if no, the processor 102 generates a backward branch such that the instruction stream loops back to the known instruction within the loop, i.e. the branch target address TA>SA and TA<PC in block 220. In block 222 the processor records TA into the TC[i] and records taken into the DC[i], increments i, stores the current PC as the Loop End Address (LA=PC) and changes the program counter to the target address of the instruction (PC=TA).

Figure 3:
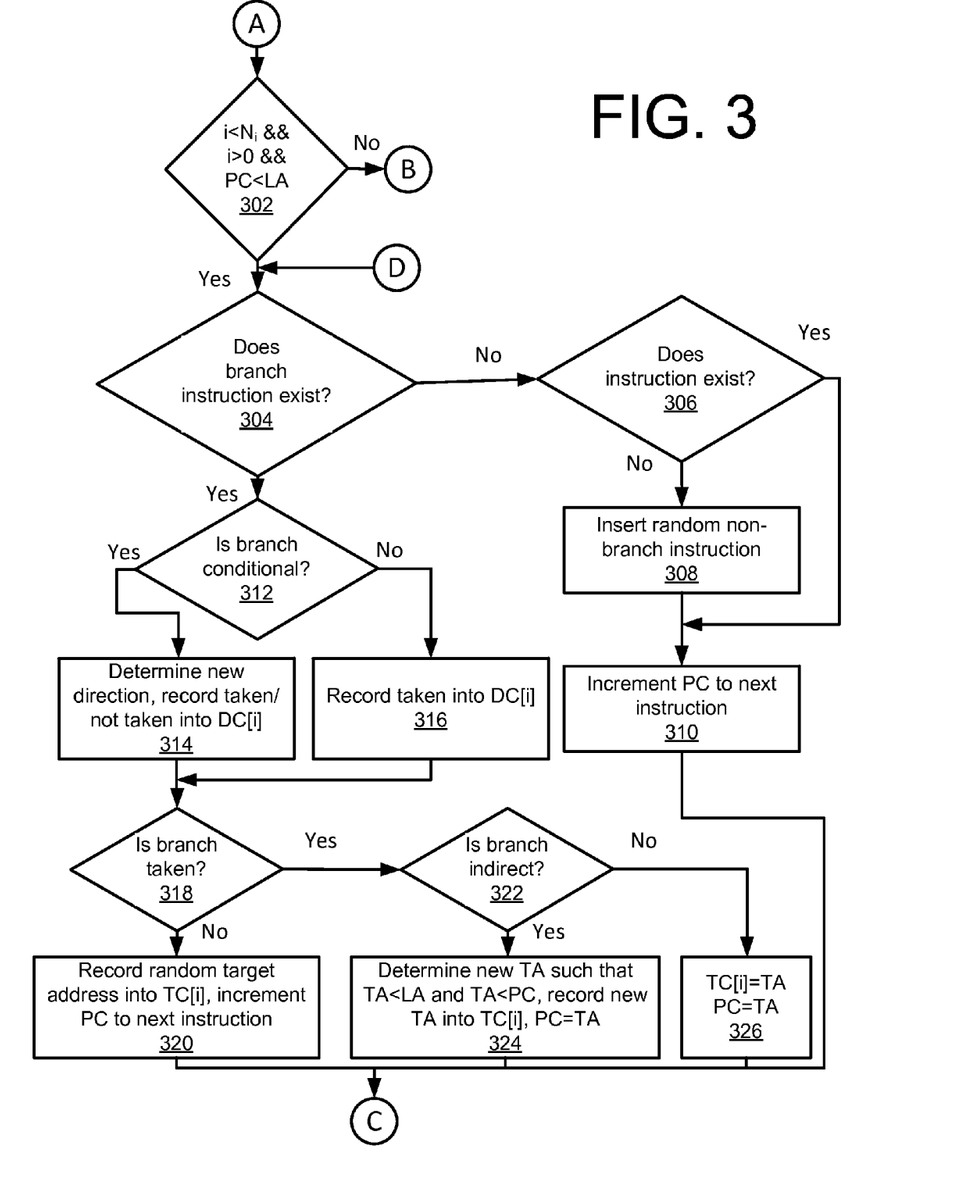
FIG. 3 illustrates a block diagram of an exemplary method of branch prediction.

Referring to FIG. 3, following "A", in block 302, the processor 102 (of FIG. 1) determines whether i<Ni and i>0 and PC<LA, where LA is the loop end address (backward branch address) i.e. it determines that current instruction pointer is for an intermediate loop and current instruction is not the last instruction of the loop. If no, the processor 102 follows "B" described in FIG. 4 below. If yes, in block 304 the processor 102 determines whether a branch instruction exists. If no, in block 306 the processor determines if an instruction exists. If no, in block 308 a random non-branch instruction is inserted into the loop. In block 310, the PC is incremented to the next instruction. If a branch instruction exists in block 304, the processor 102 determines whether the branch is conditional in block 312. If yes, the processor 102 determines a new direction, and records the determined direction (taken/not taken) into the DC[i] in block 314. If no, in block 316, the processor 102 records taken into the DC[i]. The processor 102 determines in block 318 whether the branch is taken. If no, a random target address is recorded into the TC[i] and the PC is incremented to the next instruction in block 320. If yes, in block 322, the processor 102 determines whether the branch is indirect. If yes, in block 324, the processor 102 determines (generates) a new target address such that TA<LA and TA>PC, records the new TA into the TC[i], and PC=TA. If no, then in block 326, records the default (generated when i==0 i.e. TC[0]) target address into TC[i] (TC[i]=TA) and PC=TA.

Figure 4:
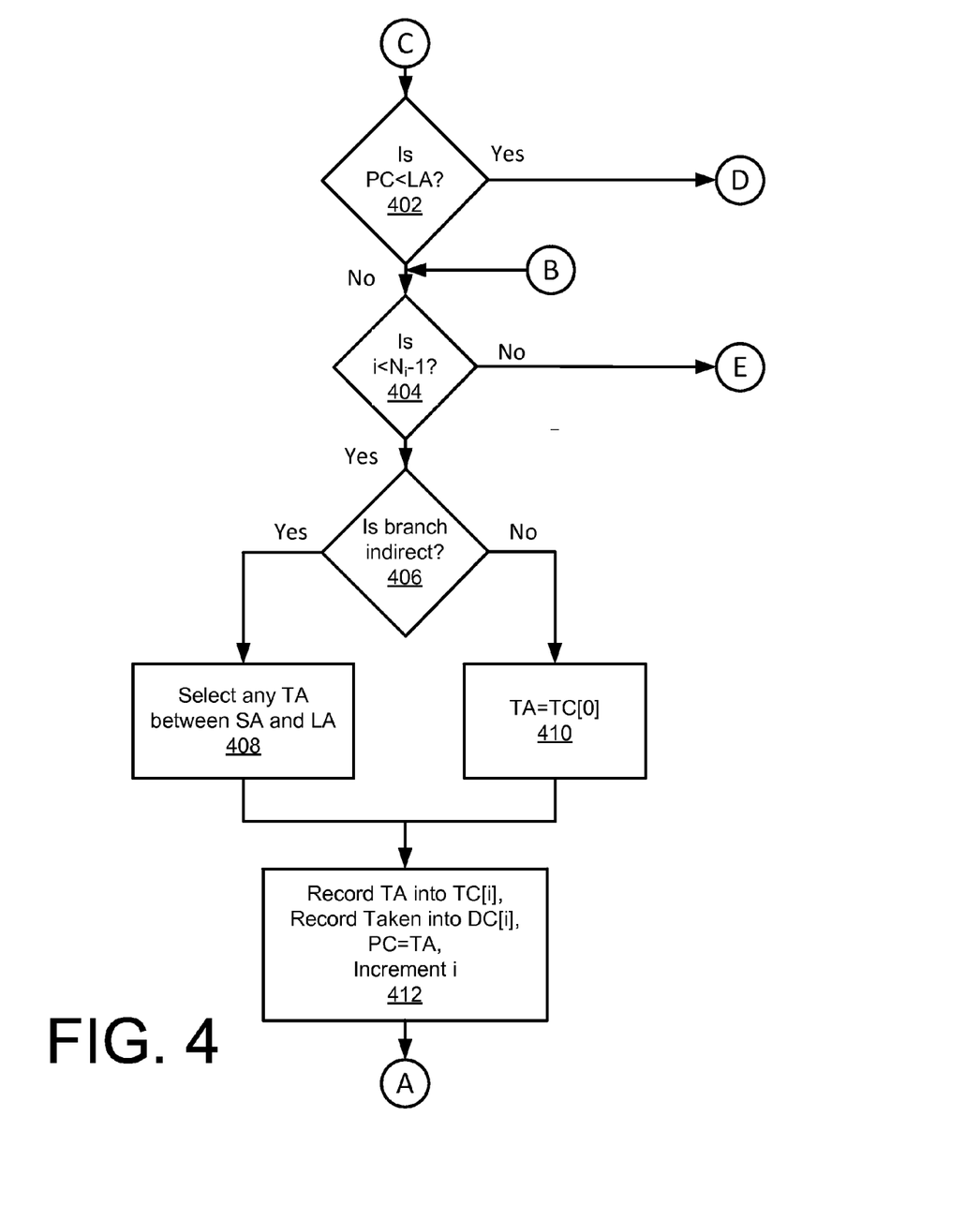
FIG. 4 illustrates a block diagram of an exemplary method of branch prediction.

Following "C" to FIG. 4, in block 402 the processor 102 (of FIG. 1) determines whether the instruction stream is in middle of the loop i.e. PC<LA. If yes, the method moves to "D" of FIG. 3. If no, in block 404, the processor 102 determines whether the method is still in the intermediate loop (i<$N_i$−1). If no, the method follows "E" to FIG. 5 described below to change the behavior of the last instruction of the loop such that instruction stream exits the loop. If yes, the processor 102 determines whether the branch is indirect in block 406. If yes, in block 408, the processor 102 selects any TA between SA and LA. If no in block 406, then in block 410, processor 102 determines the target address for the current branch instruction as the default target address i.e. TA=TC[0]. In block 412, the TA is recorded into the TC[i], taken is recorded into DC[i], PC=TA, and i is incremented.

Figure 5:
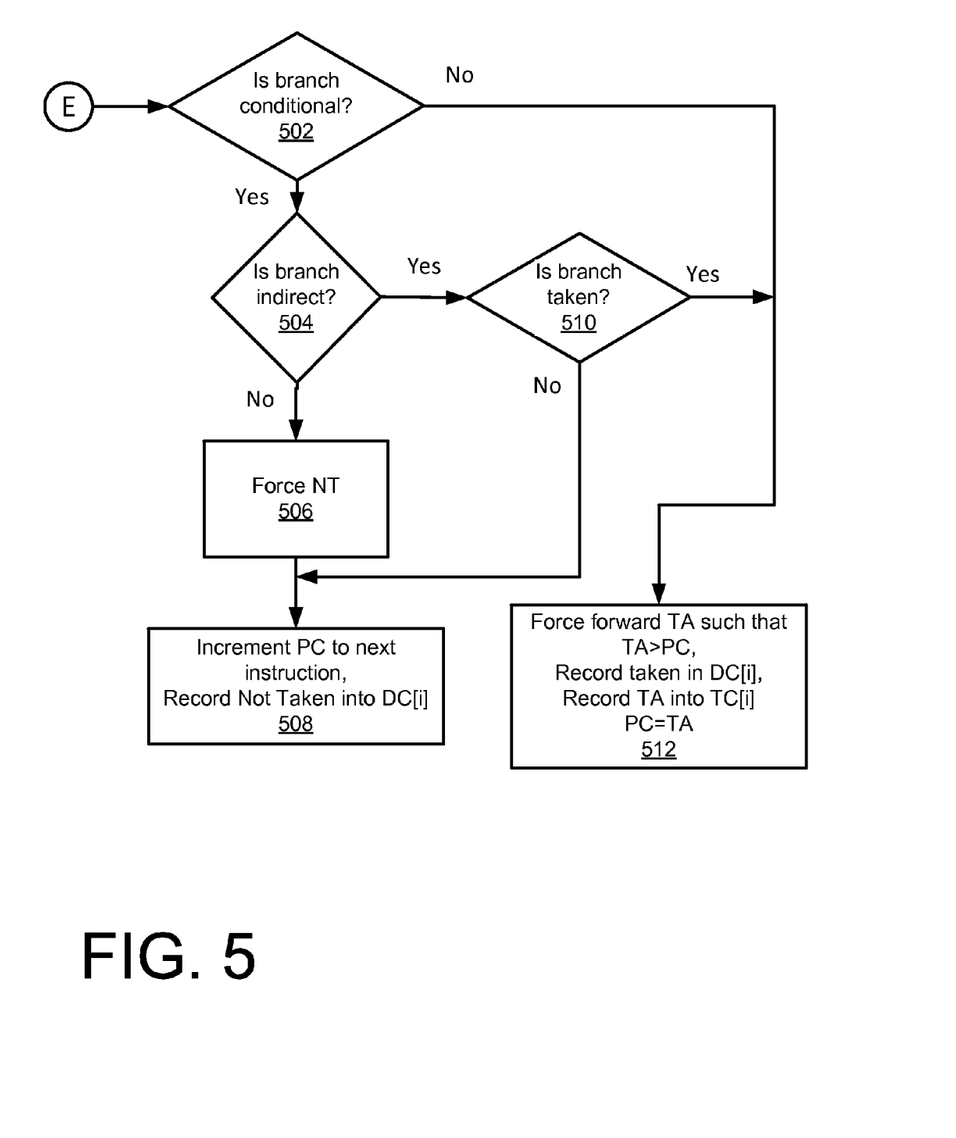
FIG. 5 illustrates a block diagram of an exemplary method of branch prediction.

Following "E" to FIG. 5, the processor 102 determines whether the branch is conditional in block 502. If yes, in block 504, the processor 102 determines whether the branch is indirect. If no, the branch is forced to be not taken in block 506. In block 508, the PC is incremented to the next instruction and not taken is recorded into DC[i], a random target address can be recorded into TC[i] Referring to block 504, if yes, the processor determines in block 510 if the branch is taken. If yes, the TA is forced forward i.e. a forward address is randomly selected such that method exits the loop (i.e. TA>PC), taken is recorded in the DC[i], the TA is recorded into the TC[i], and PC=TA.

The exemplary methods and systems described above can be used by an instruction stream generator that lacks the functionally to routinely generate nested finite loops with branch instructions that behave differently. These exemplary methods and systems can increase the effectiveness of verifying such pattern based branch prediction methods.

The method and systems described above fit into a constrained random environment and provide quality stimulus to verify pattern history table based branch prediction logic (BPL). This is achieved by generating a loop in a random instruction stream that contains a number of branch instructions that change behavior each time the branch instructions are encountered; with the underlying assumption that a given branch is encountered via different instruction paths.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying a number of branches ($N_b$) and a number of iterations ($N_i$) in a loop in an instruction stream of a processor;
   generating a number of forward branches until the number of forward branches equals $N_b$;
   generating a non-branch instruction in between each of the number of forward branch instruction;
   recording in a memory, instruction stream generated and a history of each branch, an associated target address of each branch, and whether the branch is a taken branch or a not taken branch;
   determining whether a loop iterator number (i) is less than $N_i$−1;
   generating a backward branch with an associated target address which is greater than or equal to the start address and is lesser than the current address responsive to determining that (i) is less than $N_i$;
   generating a forward branch with an associated target address which is greater than the current address responsive to determining that loop iterator number (i) is equal to Ni−1; and
   recording in the memory, a branch instruction of the generated backward branch and the associated target address of the backward branch.

2. The method of claim 1, further comprising reevaluating an instruction resolution if the instruction is a conditional branch instruction.

3. The method of claim 2, further comprising determining whether a direction of the conditional branch instruction is taken or not taken and moving to the associated target address responsive to determining that the direction of the conditional branch instruction is taken.

4. The method of claim 3, further comprising following the conditional branch instruction to a sequential instruction responsive to determining that the direction of the conditional branch instruction is not taken.

5. The method of claim 4, further comprising recording a direction selected for the conditional branch instruction per iteration of the loop in the instruction stream of the processor.

6. The method of claim 5, further comprising determining a forward target address of the instruction responsive to determining that the instruction is an indirect branch instruction.

7. The method of claim 6, wherein the forward target address is less than the address of a loop end address of the instruction and greater than the current instruction address.

8. The method of claim 7, further comprising recording the target address selected for the instruction determined to be an indirect branch instruction.

9. The method of claim 8, further comprising generating random instructions when i==$N_i$.

10. A system comprising:
    a memory; and
    a processor operative to:
       identify a number of branches ($N_b$) and a number of iterations ($N_i$) in a loop in an instruction stream of a processor;
       generate a number of forward branches until the number of forward branches equals $N_b$;

record in the memory, a history of each branch, an associated target address of each branch, and whether the branch is a taken branch or a not taken branch;

determine whether a loop iterator number (i) is less than $N_i$;

generate a backward branch with an associated target address which is greater than or equal to the start address and is lesser than the current address responsive to determining that it is less than $N_i$; and record in the memory, a branch instruction of the generated backward branch and the associated target address of the backward branch.

11. The system of claim 10, wherein the processor is further operative to reevaluate an instruction resolution if the instruction is a conditional branch instruction.

12. The system of claim 11, wherein the processor is further operative to determine whether a direction of the conditional branch instruction is taken or not taken and moving to the associated target address responsive to determining that the direction of the conditional branch instruction is taken.

13. The system of claim 12, wherein the processor is further operative to follow the conditional branch instruction to a sequential instruction responsive to determining that the direction of the conditional branch instruction is not taken.

14. The system of claim 13, wherein the processor is further operative to record a direction selected for the conditional branch instruction per iteration of the loop in the instruction stream of the processor.

15. The system of claim 14, wherein the processor is further operative to determine a forward target address of the instruction responsive to determining that the instruction is an indirect branch instruction.

16. The system of claim 15, wherein the forward target address is less than the address of a loop end address of the instruction and greater than the current instruction address.

17. The system of claim 16, wherein the processor is further operative to record the target address selected for the instruction determined to be an indirect branch instruction.

18. The system of claim 17, wherein the processor is further operative to generate random instructions when $i=N_i$.

19. A computer program product comprising a non-transitory computer readable storage medium having program instructions embodied therewith, the program instructions executable by a processor to cause the processor to perform a method comprising:

identifying a number of branches ($N_b$) and a number of iterations ($N_i$) in a loop in an instruction stream of a processor;

generating a number of forward branches until the number of forward branches equals $N_b$;

generating a non-branch instruction in between the forward branch instruction;

recording in a memory, instruction stream generated and a history of each branch, an associated target address of each branch, and whether the branch is a taken branch or a not taken branch;

determining whether a loop iterator number (i) is less than $N_i-1$;

generating a backward branch with an associated target address which is greater than or equal to the start address and is lesser than the current address responsive to determining that (i) is less than $N_i$;

generating a forward branch with an associated target address which is greater than the current address responsive to determining that loop iterator number (i) is equal to Ni−1; and recording in the memory, a branch instruction of the generated backward branch and the associated target address of the backward branch.

20. The computer program product of claim 19, wherein the method further comprises reevaluating an instruction resolution if the instruction is a conditional branch instruction.

* * * * *